Figure 1:
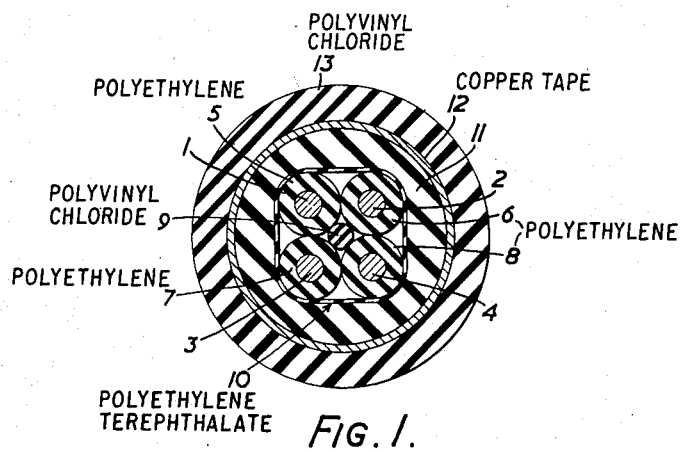

Sept. 28, 1965  A. E. CUTLER  3,209,064
SIGNAL TRANSMISSION ELECTRIC CABLES
Filed Oct. 16, 1962  2 Sheets-Sheet 1

INVENTOR
Albert Ernest Cutler
BY
Richard Lund Opt

Sept. 28, 1965 A. E. CUTLER 3,209,064
SIGNAL TRANSMISSION ELECTRIC CABLES
Filed Oct. 16, 1962 2 Sheets-Sheet 2

INVENTOR
Albert Ernest Cutler
BY

United States Patent Office 3,209,064
Patented Sept. 28, 1965

3,209,064
SIGNAL TRANSMISSION ELECTRIC CABLES
Albert Ernest Cutler, Barnet, England, assignor to Communications Patents Limited, London, England
Filed Oct. 16, 1962, Ser. No. 230,890
Claims priority, application Great Britain, Oct. 19, 1961, 37,478/61
6 Claims. (Cl. 174—36)

This invention relates to electric cables for electric signal transmission purposes, comprising a plurality of pairs of conductors whereby at least two electric signals may be propagated along the cable, one along the signal path defined by one pair of conductors and the other along the signal path defined by another such pair of conductors. In such cables cross-coupling, that is to say cross-talk or cross-view, is often experienced between the two signals being propagated. This cross-coupling is due to an electric field generated about the conductors by the passage of high frequency currents therethrough. The field has two components each due to a particular one of two causes. The first component is due to the propagation of balanced signal currents along the conductors of each pair and the second component is due to the propagation of longitudinal currents along at least one of the pairs resulting from unbalanced components in the signal currents. These unbalanced components are due to minor inaccuracies in the cable and the signal sending and signal receiving apparatus connected thereto and have a velocity of propagation which differs from that of the balanced signal currents.

In its broadest aspect the invention provides an electric signal transmission cable in which cross-talk between two pairs of conductors due to longitudinal currents is minimised by the selective use of dielectric materials in a manner which ensures that the attenuation of said field caused by currents propagated along the cable will be greater than that of the field caused by balanced signal currents propagated along the cable.

More specifically there is provided according to one aspect of the invention an electric signal transmission cable comprising at least two pairs of mutually insulated conductors and, about said conductors and their insulation, and within the field generated by current passage through the conductors a dielectric which has a power factor which is poor relative to that of said insulation, whereby longitudinal currents propagated along the cable are attenuated to a greater extent than balanced signal currents propagated along said cable.

According to another aspect of the invention there is provided an electric signal transmission cable comprising at least two pairs of mutually insulated conductors, a dielectric about said conductors and their insulation, and a conductive screening member about said dielectric, said dielectric having a power factor which is poor relative to that of said insulation, whereby longitudinal currents propagated along the cable are attenuated to a greater extend than balanced signal currents propagated along said cable.

According to a further aspect of the invention there is provided an electric signal transmission cable comprising at least two pairs of conductors mutually insulated by an insulant suitable for use at high frequencies, a conductive screen about said conductors and their insulation and between said screen and the conductors and insulation, a dielectric having a power factor at said high frequencies which is poor relative to that of said insulation whereby longitudinal currents propagated along the cable are attenuated to a greater extent than balanced signal currents propagated along said cable.

In one particular embodiment of the invention a pair of mutually insulated conductors is located in and along each of a plurality of cavities or channels provided in a central core member and this core member is formed from a dielectric material having a power factor which is poor relative to that of the insulation of the said conductors.

This invention has particular application in connection with wired broadcasting systems of the kind in which multi-pair cable is used to establish a signal-distributing network in respect of a plurality of different television programmes. Thus according to another aspect of this invention there is provided a wired broadcasting system of this kind in which a signal-distributing network pertaining to television picture signals, alone or in conjunction with the accompanying sound signals at audio or carrier frequencies, comprises a cable having at least two pairs of mutually insulated conductors arranged within an electrically conductive screen and, intermediate this group of insulated conductors and said screen, a dielectric material having a power factor which is poor in relation to that of the said insulation, whereby undesired longitudinal currents in the network are attenuated to a greater extent than the balanced signal currents therein.

Figure 2:
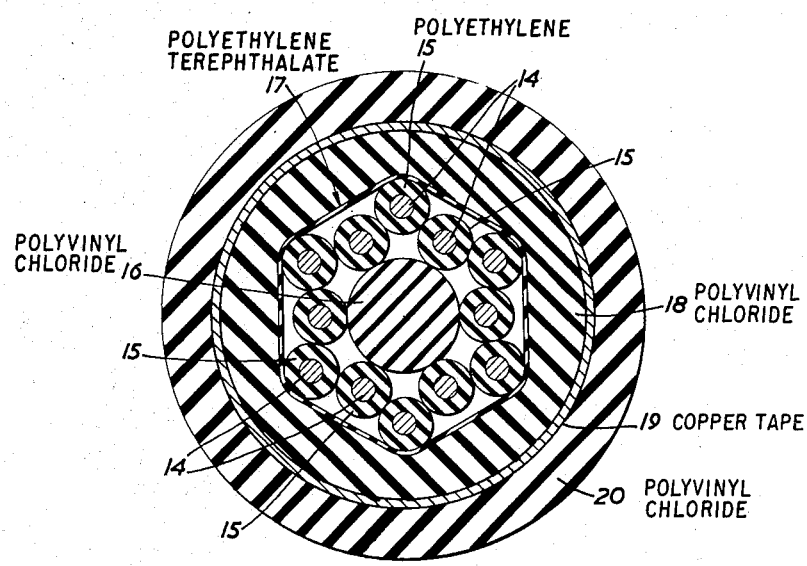
Figure 3:
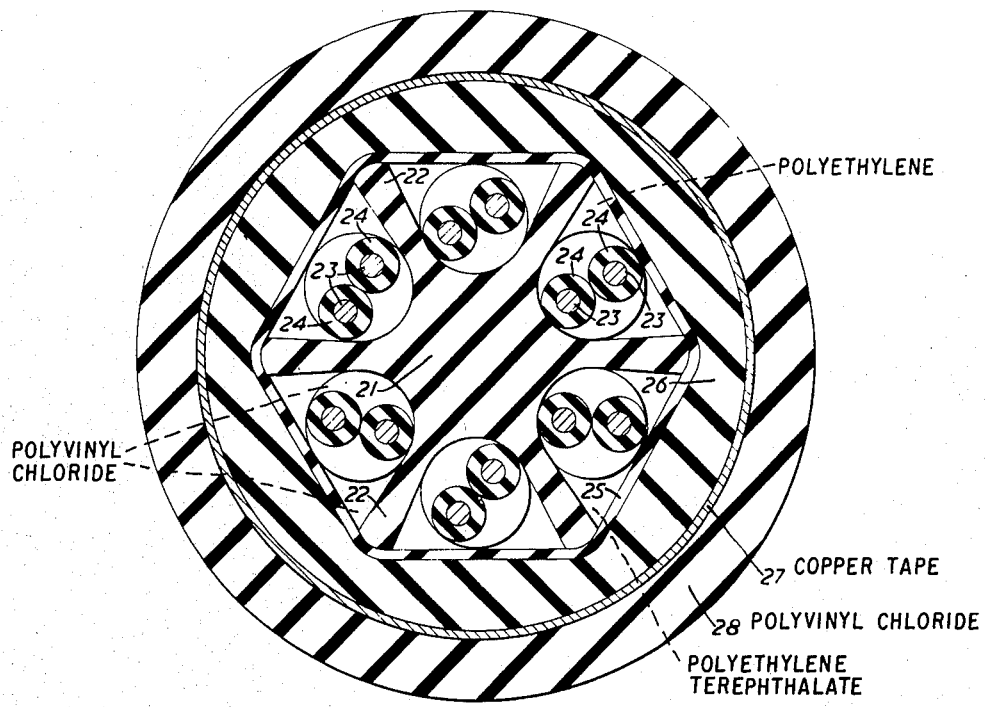

Further features and advantages of the invention will become apparent from the following description of three particular embodiments thereof, given by way of example only, with reference to the accompanying drawings in which:

FIG. 1 is a cross-sectional view of a first embodiment of electric cable in accordance with the present invention, and FIG. 2 is a cross-sectional view of a second embodiment of electric cable in accordance with the present invention, and FIG. 3 is a cross-sectional view of a third embodiment of electric cable in accordance with the present invention.

In the quad cable shown in FIG. 1 there are two pairs of parallel conductors 1, 2 and 3, 4 respectively and mutually insulated by coverings of insulation 5–8 respectively and formed of a material suitable for insulating the conductors in respect of high frequency signalling currents, such for example as polyethylene having a power factor, tan $\delta$ <.001. These conductors with their insulation are wound around a core string 9 of polyvinyl chloride and lapped with one or more strips 10 of a material such for example as polyethylene terephthalate. About this lapped assembly of conductors is a layer 11 of dielectric having a power factor at the frequencies of said high frequency signalling currents which is poor relative to that of the insulation coverings 5–8. A material suitable for the layer 11, is, for example, polyvinyl chloride. About the layer 11 is a conductive screening member 12 formed, for example, of copper or aluminium tape and about this screen there is a protective coating 13 which is formed of polyvinyl chloride or any other suitable material.

The cable shown in FIG. 2 includes six twisted pairs of conductors. Each of these conductors, 14, is mutually insulated by coverings of insulation 15. This insulation is suitable for insulating the conductors 14 at high frequency signalling currents and is, for example, of polyethylene having the hereinbefore given power factor. The conductors 14 with their insulation 15 are wound around a core string 16 of polyvinyl chloride and the wound assembly is lapped by a layer 17 of, for example, polyethylene terephthalate. Around the lapping 17 is a layer 18 of dielectric which has a power factor at the frequencies of said high frequency signalling currents which is poor relative to that of the insulation 15. A material suitable for the dielectric layer 18 is, for example, polyvinyl chloride. About the layer 18 there is a conductive screening member 19 formed, for example, of copper or aluminium tape. This screening member has about it a protective coating 20 formed, for example, of polyvinyl chloride or any other suitable material.

The cable shown in FIG. 3 is basically similar to that shown in FIG. 2 but in this modified arrangement the cylindrical core string (16 of FIG. 2) is replaced by a multi-channelled structure which serves to isolate the individual pairs of conductors and also ensures their more permanent relative positional relationship. This multi-channelled structure is formed from a material having a poor power factor, for example polyvinyl chloride, and comprises a central portion 21 and six equally spaced fins or ribs 22. The cavity provided between each pair of these fins accommodates a separate pair of insulated conductors, namely conductors 23 which are insulated with a layer 24 of polyethylene. Each pair of insulated conductors is twisted and the twisted pair fit snugly within the curved inner end of its accommodating cavity. This assembly of the six twisted pairs of conductors is lapped by a layer 25 of insulating material such for example as polyethylene terephthalate and about this lapping layer there is provided a layer of dielectric material 26 which has a power factor, at the frequency of the signal currents concerned which is poor relative to that of the insulating material 24 about the individual conductors 23. A suitable material for the dielectric 26 is for example polyvinyl chloride. A conductive screening member such for example as a copper or aluminium tape 27 is provided around the insulating dielectric material 26 and this screen is provided with a protective coating 28 of any desired suitable material, for example, polyvinyl chloride.

Since the pairs of conductors are insulated by a material having a satisfactory power factor at the signal frequencies concerned and the insulated pairs of conductors are lapped the dielectric between these conductors is the insulating material and air. Thus only the fringe fields of these conductors enter the dielectric of poor power factor increasing the attenuation of the cable to the desired signal currents by a negligible amount. The longitudinal currents on the other hand are propagated by utilising as one conductor both the conductors of one pair and as the other both the conductors of another pair or the screen. The field between these conductors passes through the dielectric of poor power factor and hence the longitudinal currents are greatly attenuated.

The cables shown in FIG. 1 or 2 have a significantly higher attenuation to longitudinal currents than to the balanced signal currents flowing in the conductors in each pair, particularly those currents which use the conductive screening member as one conductor. The cable structure shown in FIG. 3 affords similar advantage but in addition the longitudinal currents which use two pairs of the conductors for their conductive paths are also attenuated more strongly than the balanced signal currents by virtue of the presence of the fins or ribs 22 of lossy material. This cable arrangement also reduces crushing of the lays of the pairs and assists in reducing cross-coupling from this source.

The invention can also be adopted in cables which do not include a conducting screen member.

If desired the dielectric of poor power factor may be of other than polyvinyl chloride or may be a loaded material. Any material used however should be easily extruded and relatively inexpensive to provide an economically acceptable. Also, instead of arranging the layer of dielectric of poor power factor directly in contact with the lapping 10 or 17, an intermediate layer of insulation in the form of a dielectric of good power factor, such for example of polyethylene, may be interposed between them.

What I claim is:
1. An electric signal transmission cable comprising, in combination:
 (a) elongated conductor means for generating an electric field when high-frequency current is passed through said conductor means, said conductor means including
  (1) two pairs of elongated conductor members, and
  (2) an elongated body of an insulating material covering each of said conductor members and insulating the same from the other conductor members;
 (b) an elongated tubular body of a dielectric in said field and covering said conductor means, the power factor of said dielectric being substantially poorer than the power factor of said insulating material; and
 (c) an elongated conductive screening member covering said conductor means and said dielectric, said dielectric being interposed between said screening member and said conductor means.

2. A cable as set forth in claim 1, wherein said dielectric is polyvinyl chloride.

3. A cable as set forth in claim 2, wherein said insulating material is polyethylene.

4. A cable as set forth in claim 1, further comprising an elongated unitary core member, said conductor members being angularly spaced about said core member, the core member being of a dielectric having a poorer power factor than said insulating material.

5. A cable as set forth in claim 4, wherein said core member is formed with a plurality of recesses respectively receiving said pairs of conductor members.

6. A cable as set forth in claim 1, further comprising lapping means of insulating material interposed between said conductor means and said dielectric.

References Cited by the Examiner
UNITED STATES PATENTS
2,614,172 10/57 Greenfield et al. _____ 174—29 X
2,636,923 4/53 Perzel _____ 174—28

OTHER REFERENCES
Design Trends: "Vinyl - Insulated Communication Cable," published in Electrical Manufacturing, February 1953, page 258.

JOHN F. BURNS, *Primary Examiner.*
JOHN P. WILDMAN, *Examiner.*